(12) United States Patent
Roziere et al.

(10) Patent No.: US 11,052,546 B2
(45) Date of Patent: *Jul. 6, 2021

(54) ROBOT EQUIPPED WITH CAPACITIVE DETECTION MEANS AND WALLS REFERENCED TO A GUARD POTENTIAL

(71) Applicant: FOGALE NANOTECH, Nîmes (FR)

(72) Inventors: Didier Roziere, Nîmes (FR); Frédéric Ossart, Langlade (FR)

(73) Assignee: FOGALE NANOTECH, Nîmes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/068,321

(22) PCT Filed: Jul. 26, 2017

(86) PCT No.: PCT/FR2017/052086
§ 371 (c)(1),
(2) Date: Jul. 5, 2018

(87) PCT Pub. No.: WO2019/020873
PCT Pub. Date: Jan. 31, 2019

(65) Prior Publication Data
US 2020/0171674 A1 Jun. 4, 2020

(51) Int. Cl.
*B25J 13/08* (2006.01)
*B25J 9/16* (2006.01)
*B25J 19/02* (2006.01)
*B25J 19/06* (2006.01)

(52) U.S. Cl.
CPC ........... *B25J 13/086* (2013.01); *B25J 9/1676* (2013.01); *B25J 19/02* (2013.01); *B25J 19/06* (2013.01)

(58) Field of Classification Search
CPC ........ B25J 13/086; B25J 9/1676; B25J 19/02; B25J 19/06; B25J 19/027; B25J 9/046
See application file for complete search history.

(56) References Cited

U.S. PATENT DOCUMENTS 5,166,679 A * 11/1992 Vranish .................. B25J 13/086
324/687
5,363,051 A 11/1994 Jenstrom et al.

FOREIGN PATENT DOCUMENTS

WO 2014/101943 A1 7/2014

OTHER PUBLICATIONS

International Search Report from International Patent Application No. PCT/FR2017/052086, dated Apr. 18, 2018.
Written Opinion of the International Searching Authority from International Patent Application No. PCT/FR2017/052086, dated Apr. 18, 2018.

* cited by examiner

*Primary Examiner* — Adam R Mott
(74) *Attorney, Agent, or Firm* — Greer, Burns & Crain, Ltd.

(57) ABSTRACT

A robot including:
for at least one sub-part, at least one measurement electrode,
at least one type of electrical polarization for polarizing the at least one measurement electrode at a first alternating electrical potential, and the at least one polarization type is also arranged in order to polarize at least one electrically conductive part of the outer wall of at least one sub-part, at an alternating electrical potential ($V_G$), called guard potential, identical or substantially identical to the first potential, at a working frequency.

14 Claims, 5 Drawing Sheets

ROBOT EQUIPPED WITH CAPACITIVE DETECTION MEANS AND WALLS REFERENCED TO A GUARD POTENTIAL

BACKGROUND

The present invention relates to a robot equipped with capacitive detection means and walls, or casings, electrically referenced, partially or wholly, to a guard potential different from a general ground potential.

The field of the invention is, non-limitatively, that of the field of robotics, in particular the field of industrial robotics or service robots, for example medical or domestic, or also collaborative robots, also called "cobots".

Industrial or domestic robots, in particular cobots, generally comprise a body on which a functional head is fastened, presented in the form of a tool or a tool-holder, allowing them to carry out one or more tasks in an environment.

These robots are involved in more and more applications, either completely autonomously, or assisting a person or an operator. They are generally equipped with sensors allowing them to detect the objects and persons located in their environment, with a view to ensuring the safety of the robot and also of the nearby objects and persons. These sensors can be provided using capacitive detection electrodes.

However, the inventors have noted that in certain situations, the capacitive electrodes with which the outer wall of the robot is equipped detect the parts making up the robot itself, in particular when the robot is a robotized arm comprising several articulated segments. Such a detection, hereinafter called "self-detection", limits the operational range of the robot. In fact, this self-detection can mask the presence of an object or a person approaching the robot and prevent the detection thereof, which is unacceptable from a safety point of view. It follows that in certain cases, the robot may put itself into degraded operating mode or freeze unnecessarily due to safety concerns.

A purpose of the present invention is to overcome this drawback.

Another purpose of the present invention is to propose a robot equipped with a more efficient detection functionality.

Another purpose of the present invention is to propose a robot equipped with a detection functionality avoiding self-detections.

Another purpose of the present invention is to propose a robot equipped with a detection functionality that does not limit the operational range of the robot and does not adversely affect the operation of the robot.

SUMMARY

At least one of these aims is achieved with a robot comprising at least one sub-part, said robot also comprising:
- for at least one sub-part, called equipped, at least one capacitive detection electrode, called measurement electrode, placed on or in an outer wall of said sub-part, in particular electrically isolated from said outer wall when said outer wall is electrically conductive,
- at least one means of electrical polarization for polarizing said at least one measurement electrode at a first alternating electrical potential ($V_G$) different from a general ground potential, at a frequency called working frequency, and
- at least one electronic unit, called detection unit, for measuring a signal relative to a coupling capacitance, called electrode-object capacitance, between the at least one measurement electrode and a nearby object;

characterized in that said at least one polarization means is also arranged in order to polarize at least one electrically conductive part of the outer wall of at least one sub-part at an alternating electrical potential ($V_G$), called guard potential, identical or substantially identical to the first potential, at said working frequency.

The fact of polarizing elements at the guard potential makes it possible to avoid the occurrence of leakage or stray capacitances between the capacitive detection electrodes and these elements at the guard potential. Thus the presence of these guard elements makes it possible to optimize the range of the capacitive detection and to make it insensitive to its environment.

Thus, the invention proposes to set the outer wall of the sub-parts of a robot at a guard potential, when said outer walls are conductive. The conductive outer wall of a sub-part, set at the guard potential, becomes electrically invisible to the capacitive detection electrodes with which this sub-part or another sub-part is equipped, and more generally to the robot. As a result, a sub-part the outer wall of which is at the guard potential will not be detected by the measurement electrodes as being a nearby object. The robot according to the invention is thus equipped with a more efficient detection functionality, which does not limit the operational range of the robot.

In the present application, two alternating potentials are identical at a given frequency when they each comprise an identical or similar alternating component at said frequency. Thus, the at least one of the two identical potentials at said frequency can also comprise a direct component, and/or an alternating component having a frequency different from said given frequency.

Similarly, two alternating potentials are different at the working frequency when they do not have an identical or similar alternating component at said working frequency.

In the present application, the term "ground potential" or "general ground potential" denotes a reference potential of the electronic unit, of the robot or of its environment, which can be for example n electrical earth or a ground potential. This ground potential can correspond to an earth potential or to another potential, connected or not to the earth potential.

Furthermore it is noted that generally, objects which are not in direct electrical contact with a particular electrical potential (electrically floating objects) tend to be polarized by capacitive coupling at the electrical potential of other objects present in their environment, such as for example earth or electrodes, if the surfaces of overlap between these objects and those of the environment (or the electrodes) are sufficiently large.

In the present application, "object" denotes any object or person that may be located in the environment of the robot.

The outer wall of a sub-part can be formed by one or more trim elements.

The outer wall of a sub-part can be a casing, rigid or not, of said sub-part.

In the present application, a sub-part of the robot can be any one of the following elements of which a robot may be composed:
- a segment of the robot, or
- a mechanical interface, articulated or not, between at least two segments, or
- a functional head, articulated or not, forming a tool, or a tool head, generally placed at a distal end of the robot.

The functional head can comprise, or can be formed by:
- a means for gripping an object, such as a gripper or a vice;
- a means for processing an object, such as a grinder, a drill, a paint gun, etc.; and/or a means for inspecting an object, such as a camera, an interferometry head, etc.

According to a non-limitative embodiment, the robot according to the invention can comprise several segments.

At least one segment can be connected to another segment by an articulated mechanical interface.

At least one segment can be connected to another segment by a mechanical interface that is not articulated.

In the robot according to the invention, at least one sub-part of said robot may not comprise a measuring electrode. In this case, this sub-part is called "non-equipped".

Alternatively, each sub-part of said robot can comprise at least one measurement electrode. In this case, this sub-part is called "equipped".

In the robot according to the invention, at least one sub-part can comprise at least one electrical item arranged in said sub-part, and/or at least one element electrically referenced to an electrical reference potential. In this case, said sub-part is called "fitted-out".

Such an electrical item can be a motor, a sensor, or actuator, etc. For example, when the sub-part is an articulated interface, also called articulation, then said interface can comprise a motor. When the sub-part is a segment, said segment can comprise an electronic module or a sensor. When the sub-part is a functional head, said functional head can comprise a motor actuating a tool, a sensor, etc.

In an embodiment, the robot according to the invention can comprise at least one sub-part, called non-equipped, not comprising a measurement electrode, at least an electrically conductive part of the outer wall of which is polarized at the guard potential.

Thus, even if this sub-part is not used by the capacitive detection functionality, it will not interfere with said detection functionality, as it is electrically invisible to the measurement electrodes of the equipped sub-parts.

In an embodiment, the robot according to the invention can comprise at least one equipped sub-part, at least one part of the outer wall of which is polarized at the guard potential.

Thus, this sub-part participates in the detection functionality in order to detect nearby objects, without being seen by the capacitive detection electrodes with which another, or the other, sub-part(s) are equipped.

In addition, the outer wall set at the guard potential advantageously forms a guard plane for the measurement electrodes with which the equipped sub-part is equipped, so as to increase the range and detection efficiency of the measurement electrodes.

According to a particularly advantageous embodiment, the polarization means can advantageously be arranged in order to polarize at the guard potential the outer wall of the majority, or of all, of the sub-parts.

Thus, the majority or all of the sub-parts become invisible for the measurement electrodes.

In this case, the robot according to the invention can comprise an interface for fastening said robot to an external support, and an electrical insulator at said fastening interface.

Thus, the outer wall of the entire robot is electrically isolated from the external support.

The external support to which the robot can be fastened can for example be the ground, or a surface of an item of equipment or machine.

The robot can thus comprise a guard provided using at least one part, or all, of the body of the robot according to the invention, polarized at the guard potential.

In fact, it is possible to polarize a significant part, or all, of the body of the robot at the guard potential. When the robot is a robotized arm, it is possible to polarize a significant part, or all, of the arm at the guard potential and to use it as a guard.

In this case, a converter electronic circuit, called interface circuit, is interfaced between the electrical circuit of this guard-polarized part of the robot, and the electrical circuit of the rest of the robot referenced to the general ground. This interface circuit generates excitation of the capacitive electronic unit referenced to the guard, and provides the interface between the electronic unit of the part polarized at the guard of the robot and the electronic unit reference to ground (supply, communication, etc.) of the rest of the robot. This interface circuit can be housed in the part referenced to the guard of the robot, or at the level of the part referenced to the ground potential of the robot.

When a part or all of the robot is covered with capacitive electrodes, and the part of the robot supporting these electrodes is referenced to the guard potential, the structure of the robot at the level of this part can thereby be simplified, as it is not necessary to insert an additional guard between the robot and these capacitive electrodes. These electrodes and the functional head can then be referenced to the same guard potential, which avoids any interference.

In an embodiment, the robot according to the invention can comprise at least one equipped sub-part the outer wall of which is not polarized at the guard potential.

When such a sub-part comprises measurement electrodes, it is necessary to insert a guard plane between the outer wall and these electrodes, in order to protect them from stray couplings. In this case, due to the presence of this guard plane and of the electrodes, said sub-part is not visible to the measurement electrodes with which the other sub-parts are equipped. In this case, it can be envisaged not to set the outer wall of a sub-part equipped with measurement electrodes at the guard potential.

The polarization at the guard potential of the outer walls of at least two sub-parts can be carried out by independent electrical lines or connections dedicated to each of said sub-parts.

Alternatively, the polarization at the guard potential of the outer walls of at least two sub-parts can be carried out by a common electrical line and an electrical connection between said sub-parts. In this case, the outer wall of one of the sub-parts is set at the guard potential by the common electrical line. The guard potential propagates to the wall of the other sub-part via said electrical connection.

As explained above, the robot according to the invention can comprise at least one sub-part, called fitted-out, comprising at least one electrical item placed in said sub-part.

Of course, the robot according to the invention can comprise at least one sub-part the outer wall of which can be at least partially non-conductive.

Such a sub-part can be a segment of the robot, a mechanical interface located between two segments, or also a functional head.

When such sub-part does not comprise an electrical item, i.e. the sub-part is called "not fitted-out", this does not interfere with the detection functionality.

However, when the sub-part is fitted-out, i.e. it comprises at least one electrical item and/or at least one element electrically referenced to an electrical reference potential, then the latter may interfere with the capacitive detection functionality.

Thus, according to embodiments, a fitted-out sub-part can also comprise, for at least one electrical item, a guard volume or walls, placed around said at least one electrical element and polarized at the guard potential.

Such a guard volume polarized at the guard potential makes it possible to render the element(s) of the sub-part invisible for the capacitive detection functionality.

According to other embodiments, a fitted-out subpart can comprise at least one electrically polarized item at, or referenced to, the guard potential.

These embodiments are particularly useful when said fitted-out sub-part comprises an outer wall that is at least partially electrically non-conductive.

The robot according to the invention can also comprise, for at least one electrical item of said fitted-out sub-part, at least one electrical converter arranged in order to
- receive at least one electrical signal, called input signal, such as a supply or control signal, intended for said at least one electrical item, and reference said input signal to the guard potential; and/or
- receive at least one electrical signal, called output signal, transmitted by said at least one electrical item, and reference said output signal to the electrical ground potential of a controller for which it is intended.

Thus, the electrical item located in the fitted-out sub-part is globally referenced to the guard potential and thus does not interfere with the capacitive detection.

This embodiment has the advantage of having a smaller space requirement, being cheaper and easier to install, compared with the one using a guard volume.

The converter can be arranged to receive the input signals referenced to the general ground potential and to convert them into signals referenced to the guard potential, and vice versa.

In a particularly advantageous version, the robot according to the invention can comprise a functional head formed by a distal sub-part.

Such a functional head is generally located at a free end of the robot.

As stated above, the functional head can comprise, or be formed by:
- a means for gripping an object, such as a gripper or a vice;
- a means for processing an object, such as a grinder, a drill, a paint gun, etc.; and/or
- a means for inspecting an object, such as a camera, an interferometry head, etc.

Advantageously, the functional head being formed by, or formed by, a sub-part, can have each of the characteristics described above for a sub-part.

It can comprise, or not comprise, at least one measurement electrode, in particular isolated from an outer wall of said functional head when said outer wall is conductive.

It can comprise, or not comprise, at least one electrical item placed in the functional head.

According to a version of the robot according to the invention, the outer wall of the functional head, when it is conductive, can be set at the guard potential.

More generally, the whole of the functional head can be set at the guard potential.

According to a version of the robot according to the invention, the functional head does not form a capacitive detection electrode. In other words, the functional head is not used as a capacitive detection electrode for detecting the presence or absence of a nearby object.

According to another version, the functional head can advantageously be used as, or form, a capacitive detection electrode. To this end, said functional head can be isolated from the rest of the robot. The at least one polarization means can also be arranged to polarize said functional head at the first alternating electrical potential, and the at least one electronic detection unit can be arranged in order to measure a signal relating to a coupling capacitance between said functional head and a nearby object.

In this version, the robot according to the invention can optionally comprise:
- at least one electrical insulator for electrically isolating said functional head from the rest of said robot, and/or
- at least one guard, polarized at the guard potential, and placed between said functional head and the rest of said robot.

when the sub-part on/in which the functional head is fastened comprises a conductive outer wall.

In this version, the functional head is used as capacitive electrode to carry out a capacitive detection of approach or contact with a nearby object or person. The coupling capacitance generated by the functional head, and in particular by the tool or the tool-holder of the robot according to the invention, and measured by the electronic detection unit, corresponds to the capacitance created between the environment and the functional head.

This present version has the advantage of providing the head of a robot with a function of capacitive detection of approach and contact, without needing to equip said functional head with capacitive electrodes. Such a solution is simple, inexpensive, not very time-consuming and robust. In addition, such a solution can be applied, with few modifications, to an existing robot which was not initially designed with such a detection function.

Moreover, when provision is made for the robot to use interchangeable functional heads, the proposed solution makes it possible to operate on said functional heads independently, without operating on the rest of the robot.

Furthermore, a further advantage of this version is the possibility of using an on-board object of the functional head, such as the extension of the functional head used as electrode. In fact, close contact between the functional head and the transported object creates significant capacitive coupling between them. The functional head and the object that it transports are naturally at a similar electrical potential. The transported object has no need to be a good electrical conductor to act as the extension of the functional head with regard to capacitive detection. A dielectric of a plastic or polymer material the dielectric permittivity of which is for example greater than 3 is sufficient to become the extension of the functional head. The transported object then forms part of the sensitive functional head.

The functional head can comprise several separate sensitive parts used as separate capacitive electrodes, and polled sequentially or in parallel by the electronic detection unit. To the extent that the sensitive parts are polarized at the same first alternating electrical potential, they constitute respectively guard elements for the others and therefore do not cause mutual interference. These separate sensitive parts can be for example the fingers of a gripping tool.

In addition, the robot according to the invention can comprise at least one electrical item placed in the functional head, such as a sensor, an actuator, a motor, and/or an associated electronic unit (conditioner, driver). In this case, the functional head is called fitted-out.

Such an electrical item can comprise, or be combined with, electrical wires which carry input/output signals to/from said electrical item.

For example, the functional head can use, or be equipped with, a gripper. The latter is generally managed by the robot via two supply wires for the power and two serial communication wires for the commands and information return.

Now, by default, these electrical items are referenced to the general ground potential, and therefore risk being detected by the sensitive part of the functional head used as capacitive electrode.

According to an embodiment, in the case in which the functional head is used as a capacitive detection electrode, for at least one electrical item placed in the functional head, said functional head can comprise a guard volume or walls, placed around said at least one electrical element and polarized at the guard potential, at the working frequency.

According to another embodiment, in the case where the functional head is used as capacitive detection electrode, it can comprise at least one electrical item arranged in said functional head, electrically polarized at or referenced to the guard potential.

In this case, the robot according to the invention can also comprise at least one electrical converter arranged in order to:

receive at least one electrical signal, called input signal, such as a supply or control signal, intended for said at least one electrical element, and reference said input signal to the guard potential ($V_G$); and/or receive at least one electrical signal, called output signal, transmitted by said at least one electrical item, and reference said output signal to the electrical ground potential of a controller for which it is intended.

Thus, the electrical element located in the functional head is globally referenced to the guard potential and thus does not interfere with the capacitive detection.

This embodiment has the advantage of having a smaller space requirement, being cheaper and easier to install.

The converter can be arranged to receive the input signals referenced to the general ground potential and to convert them at the output into signals referenced to the guard potential, and vice versa.

The converter can be dedicated to the functional head.

Alternatively, the converter can be common to at least one other fitted-out sub-part for which a reference potential conversion functionality is desired or necessary, as described above.

According to the embodiments, such a converter, for a sub-part and/or a functional head, can comprise at least one of the following elements:

at least one supply with galvanic isolation, such as a DC/DC converter, in particular for generating a supply input signal for said at least one electrical item;

at least one electrical interface without galvanic contact, of the capacitive type or by opto-coupler, for at least one control input signal, or at least one output signal;

one or more high-impedance inductors for receiving and transmitting at least one input signal or at least one output signal;

at least one capacitor-commutated charge-transfer or charge-pump converter;

diode devices.

According to an embodiment, all the electrical items arranged in the robot according to the invention can be electrically referenced to the guard potential ($V_G$), through a single, or several, converter(s).

It must be noted that to the extent that the detection of the capacitive coupling is carried out at a working frequency, the input/output electrical signals relating to the electrical items of the robot do not interfere with the measurement of the coupling capacitance as they are rejected or filtered by the electronic capacitive detection unit. This is even more efficient, in the case of a synchronous demodulation of the signal measured by the electronic detection unit.

According to an embodiment, for at least one, in particular each, sub-part, the outer wall of said sub-part can be produced at least partially from an electrically conductive material, such as for example from a conductive metal.

According to an alternative embodiment, the outer wall of at least one, in particular each, sub-part can be produced from a base material that is electrically non-conductive comprising an electrically conductive layer. The electrically conductive layer can be deposited on the outer surface of the base material, or placed in the thickness of the base material.

The base material can for example be plastic, wood, etc.

The electrical polarization means can advantageously comprise an oscillator that generates an alternating excitation voltage used as first alternating electrical potential.

This alternating excitation voltage can also be used as guard potential ($V_G$).

The robot according to the invention can comprise a single polarization means.

Alternatively, the robot according to the invention can comprise an electronic polarization means dedicated to a segment, an articulation or the functional head.

The electronic detection unit can advantageously comprise a circuit comprising a current or charge amplifier. Such an amplifier can be produced by an operational amplifier and a counter-reaction capacitor.

According to preferential embodiments, the electronic detection unit, in particular the operational amplifier, can be supplied at a potential referenced to the guard potential.

According to other embodiments, the electronic detection unit can be supplied at a potential referenced to the general ground potential.

The electronic detection unit can also comprise a conditioner or conditioning means making it possible to obtain a signal representative of the sought electrode-object capacitance, and/or the presence or the proximity of an object.

This conditioner can comprise for example a synchronous demodulator for demodulating the signal with respect to a carrier, at a working frequency.

The conditioner can also comprise an asynchronous demodulator or an amplitude detector.

This conditioner can of course be produced in an analogue and/or digital form (microprocessor), and comprise all necessary means of filtering, conversion, processing etc.

The capacitive measurement signals, in particular the signals originating from the conditioner if applicable, can then be processed by software or a management module, which makes it possible to manage the detection of approach and touch, and in particular to exploit these items of information as a function of the context of use of the robot.

Such a software, or calculation module, can for example be incorporated into a calculator or controller of the robot.

By way of example, the robot according to the invention can easily detect a human hand at a distance of more than 10 cm.

The robot according to the invention can comprise a single electronic detection unit.

Alternatively, the robot according to the invention can comprise an electronic detection unit dedicated to a sub-part, such as a segment, an articulation or the functional head.

The electronic detection unit and/or the polarization means can be partially or entirely placed in the body of the robot.

Alternatively, the electronic detection unit and/or the polarization means can be placed outside the robot and connected to said robot by one or more electrical connections.

According to non-limitative embodiments, the robot according to the invention can be or comprise any robotized system. It can in particular have the form of, or comprise, a robotized arm.

The robot can also be or comprise for example a mobile robot, a vehicle on wheels such as a fork lift equipped with an arm or a handling system, or a robot of the humanoid or android type, optionally provided with movement items such as members.

BRIEF DESCRIPTION OF THE DRAWINGS

Other advantages and characteristics will become apparent on reading the detailed description of non-limitative examples and from the attached drawings in which.

DETAILED DESCRIPTION

It is well understood that the embodiments that will be described hereinafter are in no way limitative. In particular, variants of the invention may be envisaged comprising only a selection of characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described may be combined together if there is no objection to such combination from a technical point of view.

In the figures, elements that are common to several figures retain the same reference.

Figure 1:
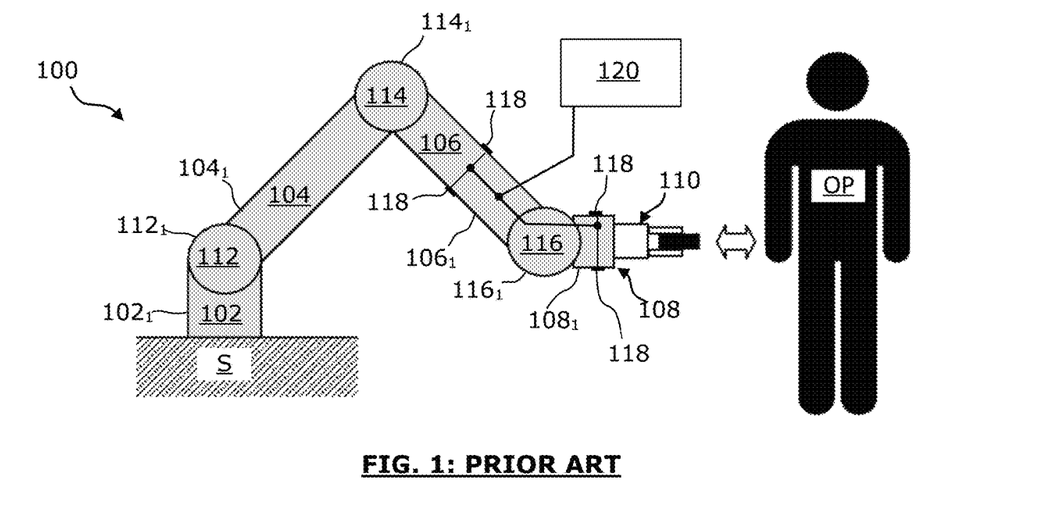
FIG. 1 is a diagrammatic representation of an example robot of the prior art equipped with capacitive detection electrodes.

FIG. 1 is a diagrammatic representation of an embodiment of a robot according to the prior art equipped with capacitive detection electrodes.

The robotized arm 100 can be, for example, an industrial collaborative robot working under the supervision of, or in collaboration with, an operator OP, or also a medical robot in the case of a surgical operation on the body of a person, or also a personal assistance robot.

The robot 100, shown in FIG. 1, is presented in the form of an articulated robotized arm comprising eight sub-parts 102-116, namely:
 four segments 102, 104, 106 and 108;
 a functional head 110; and
 three mechanical interfaces 112, 114 and 116.

Segment 102 is the base segment fastened to a support S, which can be the ground. The segment 108 is the segment located on the side of a free end of the robot 100. Each segment 102-108 is delimited by an outer wall, respectively $102_1$-$108_1$, produced by the surface of an element of the structure of the segment, or by one or more cover elements, for example made from plastic material (polymer) or metal(s). Generally, each segment 102-108 is hollow and enables electrical or electronic items to be placed in said segment.

The functional head 110 is located on the side of the segment 108, and forms a tool or a tool-holder, which in the example shown is a gripper.

Segments 102-108 are articulated by means of the articulated mechanical interfaces 112-116, also called "articulations" hereinafter. Articulation 112 is located between segments 102 and 104, articulation 114 is located between segments 104 and 106, and articulation 116 is located between segments 106 and 108. Each segment 112-116 comprises a wall or outer wall, respectively $112_1$-$116_1$, produced from one or more cover elements, for example made from plastic material (polymer) or metal(s).

Each of the articulations 112-116 is an articulation rotating about an axis. Alternatively, at least one articulation 112-116 can, additionally or instead, be a translational articulation, and/or a rotational articulation with several axes.

The articulated segments 106 and 108 are equipped with one or more capacitive detection electrodes 118, called measurement electrodes. Each measurement electrode 118 with which the segment 106, respectively the segment 108, is equipped, is electrically isolated from the outer wall $106_1$, respectively $108_1$, of this segment.

An electronic module 120 is associated with the robot 100. This electronic module 120 comprises:
 an electronic polarization unit polarizing each measurement electrode 118 at a first alternating potential, different from a general ground potential (MG), at a non-zero working frequency; and
 an electronic measurement unit for measuring an electrical signal, in particular an electric current, for each of the measurement electrodes 118 in order to deduce therefrom a capacitance, called electrode-object capacitance, resulting from a capacitive coupling between the measurement electrode and an object in its vicinity electrically polarized at the ground potential (MG) or at least at a potential different from the first alternating potential, and representative of a distance between said measurement electrode 118 and a nearby object.

Each measurement electrode 118 is also preferably guarded by an electrode, called guard electrode (not shown) polarized by an alternating guard potential, denoted $V_G$, identical or substantially identical to the first potential at the working frequency, and placed between the wall of the segment and the measurement electrode 118.

Thus, the robot 100 can detect an object located in its environment by means of the measurement electrodes 118.

However, in certain configurations, the measurement electrodes 118 also detect the segments 102-108 themselves, or the functional head 110. For example, when one of the equipped segments 106 or 108 come close to the segment 102 or the segment 104 or also the functional head 110, then the measurement electrodes 118 equipping this segment detect it as being a nearby object, when this is not the case. The measurement electrodes 118 of one of the equipped segments 106-108 can thus detect the other one of the equipped segments 106-108 as being a nearby object, for example when the other segment is equipped with a small number of measurement electrodes 108.

These self-detections reduce the operational range of the robot 100 and detract from its functionality.

The invention makes it possible to overcome this drawback.

Figure 2:
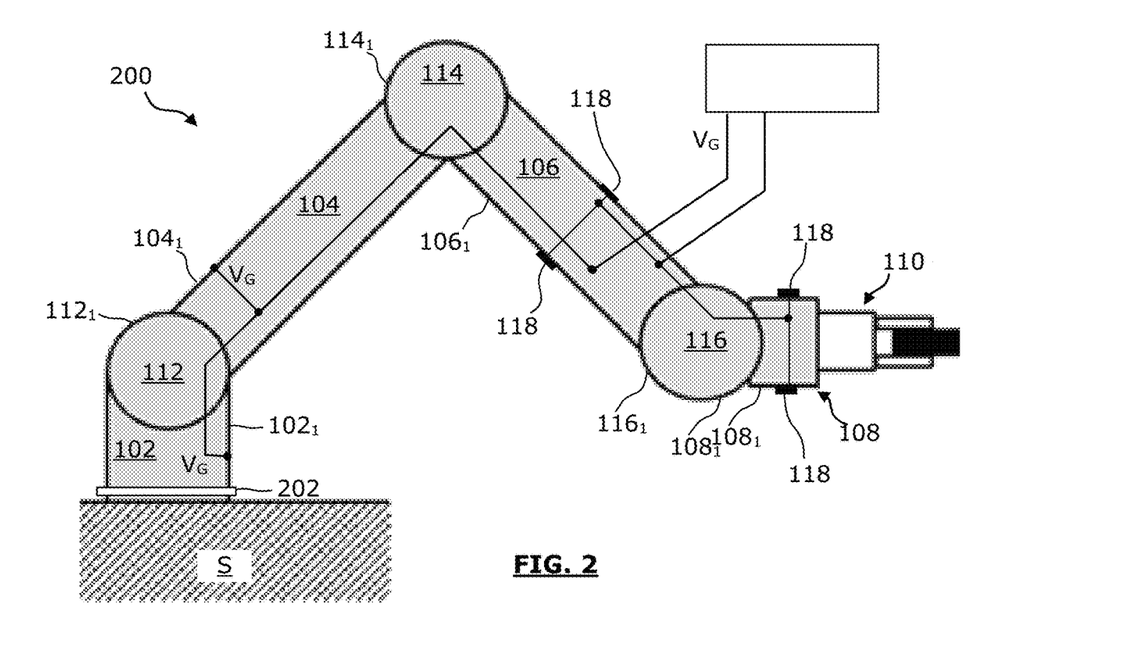
FIGS. 2-5 are diagrammatic representations of different embodiments of a robot according to the invention.

FIG. 2 is a diagrammatic representation of a non-limitative embodiment of the robot according to the invention.

The robot 200, shown in FIG. 2, comprises all the elements of the robot 100 in FIG. 1.

In addition to what is described for the robot 100 in FIG. 1, in the robot 200 in FIG. 2, the base segment 102 is electrically isolated from the support S by an insulating gasket 202.

In addition, the outer walls $102_1$ and $104_1$ of the segments 102 and 104 are made from an electrically conductive material and polarized at a guard potential, denoted $V_G$, identical or substantially identical to the first potential at the working frequency.

Thus, the outer walls $102_1$ and $104_1$ of the segments 102 and 104, not equipped with measurement electrodes, are set at the guard potential $V_G$. As this guard potential $V_G$ is identical to the first potential at the working frequency, the non-equipped segments 102 and 104 are electrically invisible to the measurement electrodes 118 with which the segments 106 and 108 are equipped, as they do not generate coupling capacitances with these electrodes. In this configuration, there is therefore no risk of the measurement electrodes 118 detecting the segments 102 and 104.

Figure 3:
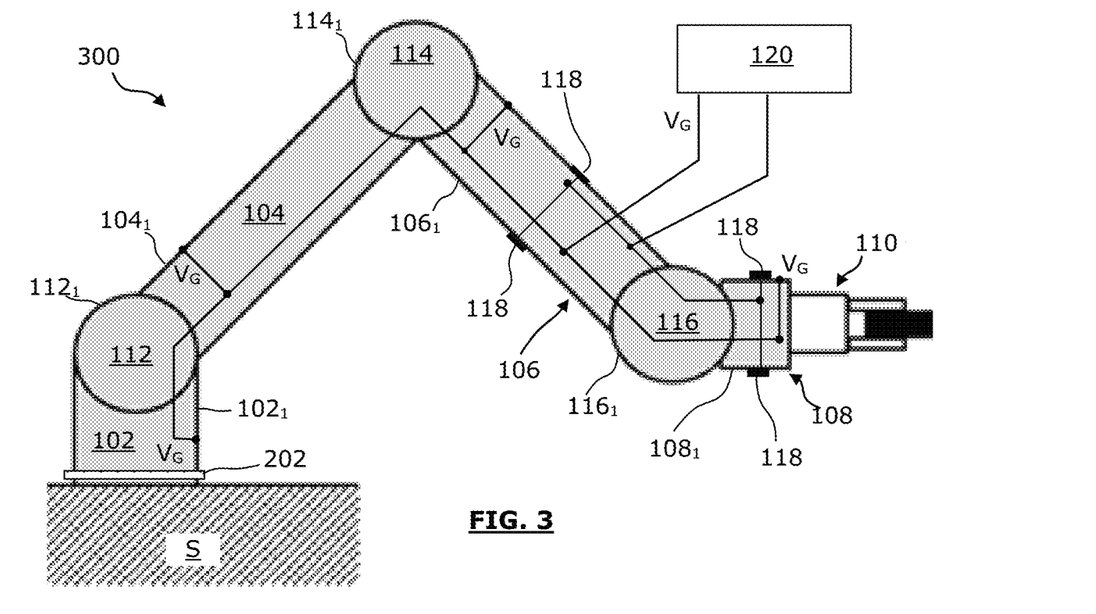

FIG. 3 is a diagrammatic representation of another non-limitative embodiment of a robot according to the invention.

The robot 300, shown in FIG. 3, comprises all the elements of the robot 200 in FIG. 2.

In addition to what is described for the robot 200 in FIG. 2, in the robot 300 in FIG. 3, the outer walls $106_1$ and $108_1$ of the segments 106 and 108 are also made from electrically conductive material and polarized at the guard potential $V_G$.

Thus, like the non-equipped segments 102 and 104, the equipped segments 106 and 108 are electrically invisible to the measurement electrodes 118 with which the segments 106 and 108 are equipped. In this configuration, there is therefore no risk of the measurement electrodes 118 detecting the segments 102-108. In this configuration, it is not necessary to insert a guard between the measurement electrodes 118 and the wall of the segments which support them, which simplifies their arrangement.

Figure 4:
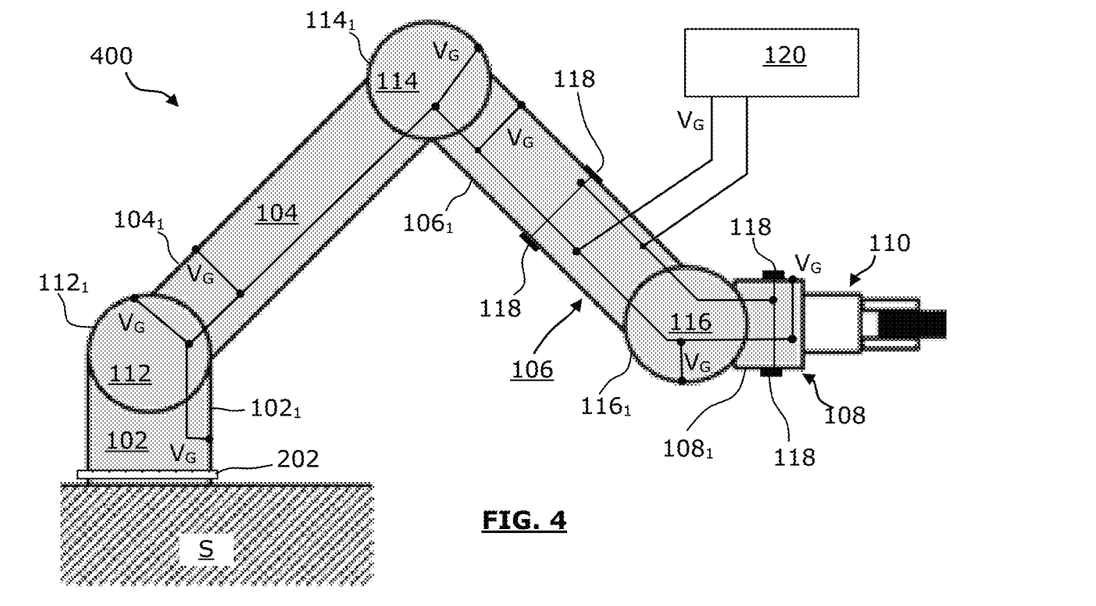

FIG. 4 is a diagrammatic representation of another non-limitative embodiment of a robot according to the invention.

The robot 400, shown in FIG. 4, comprises all the elements of the robot 300 in FIG. 3.

In addition to what is described for the robot 300 in FIG. 3, in the robot 400 in FIG. 4, the outer walls $112_1$, $114_1$ and $116_1$ of the segments 112-116 are also made from electrically conductive material and polarized at the guard potential $V_G$.

Thus, like the segments 102-108, the articulations 112-116 are also electrically invisible to the measurement electrodes 118 with which the segments 106 and 108 are equipped. In this configuration, there is therefore no risk of the measurement electrodes 118 detecting the segments 102-108, or the articulations 112-116.

Figure 5:
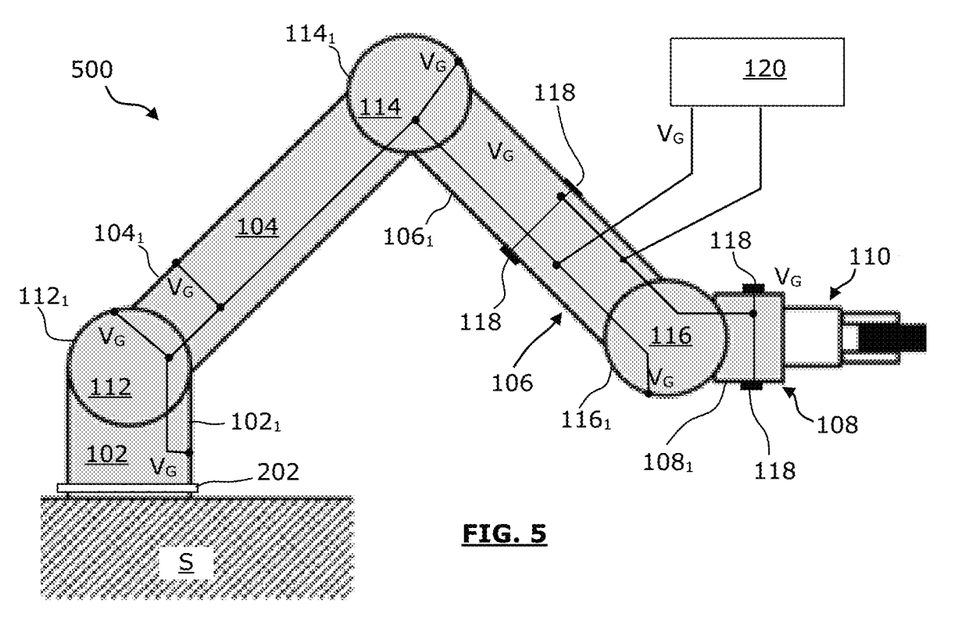

FIG. 5 is a diagrammatic representation of another non-limitative embodiment of a robot according to the invention.

The robot 500, shown in FIG. 5, comprises all the elements of the robot 200 in FIG. 2.

In addition to what is described for the robot 200 in FIG. 2, in the robot 500 in FIG. 3, the outer walls $112_1$, $114_1$ and $116_1$ of the articulations 112-116 are also made from electrically conductive material and polarized at the guard potential $V_G$.

Thus, like the non-equipped segments 102 and 104, the articulations 112-116 are electrically invisible to the measurement electrodes 118 with which the segments 106 and 108 are equipped. In this configuration, there is therefore no risk of the measurement electrodes 118 detecting the segments 102-104, or the articulations 112-116.

In the examples which have just been described, only the segments 106 and 108 are equipped with measurement electrodes 118.

Of course, in alternative embodiments, at least one, in particular each segment of the robot can be equipped with measurement electrodes.

Alternatively or in addition, the functional head of the robot can also be equipped with measurement electrodes.

Alternatively or in addition, the articulations 112-116 can also be equipped with measurement electrodes.

Examples of a functional head that can be utilized in the robot according to the invention, in particular in combination with any one of the above-described robots 200, 300, 400 and 500 will now be described.

Figure 6:
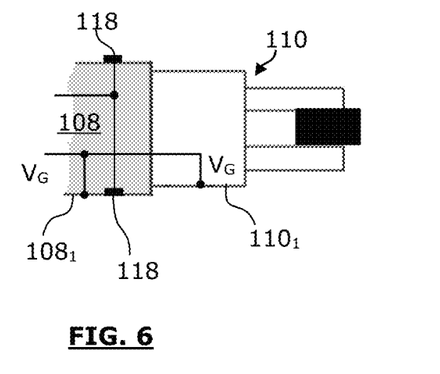
FIGS. 6-11 are partial diagrammatic representations of different examples of a functional head with which a robot according to the invention can be equipped.

FIG. 6 is a diagrammatic representation of an example of a functional head that can be utilized in a robot according to the invention, in particular in any one of the robots in FIGS. 2-5.

In the example shown in FIG. 6, the outer wall of the segment 108 on which the functional head 110 is fastened, is polarized at the guard potential $V_G$.

In addition, the functional head, or the outer wall $110_1$ of the functional head 110, is also set at the guard potential $V_G$.

Thus, the functional head 110 is electrically invisible to the measurement electrodes 118 with which the segments 106 and 108 are equipped. In this configuration, there is therefore no risk of the measurement electrodes 118 detecting the functional head.

Figure 7:
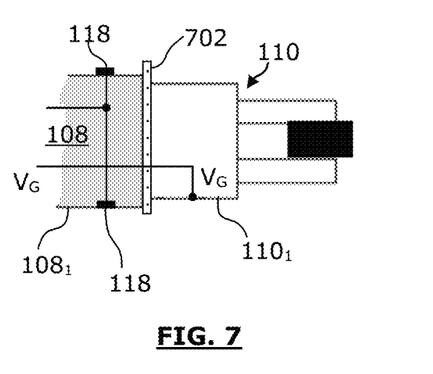

FIG. 7 is a diagrammatic representation of another example of a functional head that can be utilized in a robot according to the invention, in particular in any one of the robots in FIGS. 2-5.

In the example shown in FIG. 6, the outer wall $108_1$ of the segment 108 on which the functional head 110 is fastened, is polarized at the guard potential $V_G$.

At the same time, the functional head 110, or the outer wall $110_1$ of the functional head 110, is polarized at the guard potential $V_G$. In addition, an electrical insulator 702 is inserted between the segment 108 and the functional head 110 so that the functional head 110 is electrically isolated from the segment 108.

Under these conditions, the functional head 110 is electrically invisible to the measurement electrodes 118 with which the segments 106 and 108 are equipped. In this configuration, there is therefore no risk of the measurement electrodes 118 detecting the functional head.

Figure 8:
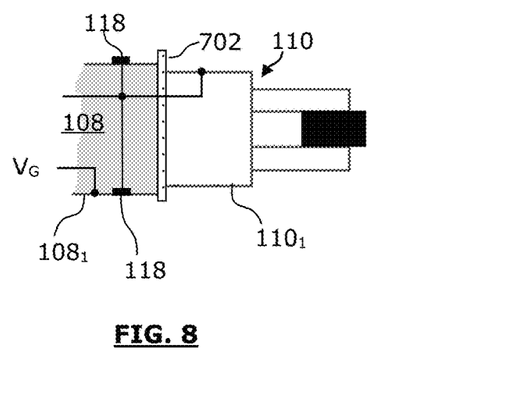

FIG. 8 is a diagrammatic representation of another example of a functional head that can be utilized in a robot according to the invention, in particular in any one of the robots in FIGS. 2-5.

In the example shown in FIG. 8, the outer wall $108_1$ of the segment 108 on which the functional head 110 is fastened, is polarized at the guard potential $V_G$.

The functional head 110 is electrically isolated from the segment 108 by the electrical insulator 702.

In addition, the functional head 110 is polarized at the first alternating potential, like the measurement electrodes 118, so as to form a capacitive detection electrode. As the wall $108_1$ of the segment 108 is at the guard potential $V_G$, the detection electrode formed by the functional head 110 is electrically guarded by said outer wall $108_1$ of the segment 108.

Under these conditions, the functional head 110 is used as a capacitive detection electrode for detecting objects or the person 102 that are present in a detection zone around the functional head 110.

The module 120 makes it possible to measure an electrical signal, in particular an electric current, relating to a coupling capacitance, called electrode-object capacitance, denoted $C_{eo}$, between the functional head 110 and its environment.

Figure 9:
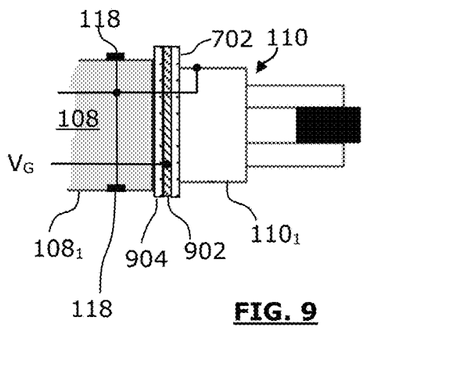

FIG. 9 is a diagrammatic representation of another example of a functional head that can be utilized in a robot according to the invention, in particular in any one of the robots in FIGS. 2-5.

In the example shown in FIG. 9, the outer wall $108_1$ of the segment 108 on which the functional head 110 is fastened, is not polarized at the guard potential $V_G$.

The functional head 110 is polarized at the first alternating potential, like the measurement electrodes 118.

In addition, a guard element 902, polarized at the guard potential $V_G$, is placed between the functional head 110 and the segment 108. This guard element 902 makes it possible to electrically guard the functional head 110 used as capacitive detection electrode.

The guard element 902 is electrically isolated from the functional head 110 by the electrical insulator 702 and from the segment 108 by an electrical insulator 904.

Under these conditions, the functional head 110 is used as a capacitive detection electrode guarded by the guard element 902 for detecting objects or the person 102 that are present in a detection zone around the functional head 110.

The guard element 902 can be produced from any electrically conductive element, for example a piece of sheet metal. The guard element 902 can be plane, or can have the form of a sleeve covering a part of the segment 108 or of the functional head 110.

In the examples of FIGS. 8 and 9, the functional head is polarized at the first electrical potential and is used as capacitive detection electrode.

However, in certain configurations, the functional head can comprise an electrical item, such as a motor, a sensor, etc. receiving an input signal and/or transmitting an output signal. In this configuration, such an electrical item interferes with the capacitive detection carried out by the functional head.

Examples will now be described which allow this drawback to be overcome.

Figure 10:
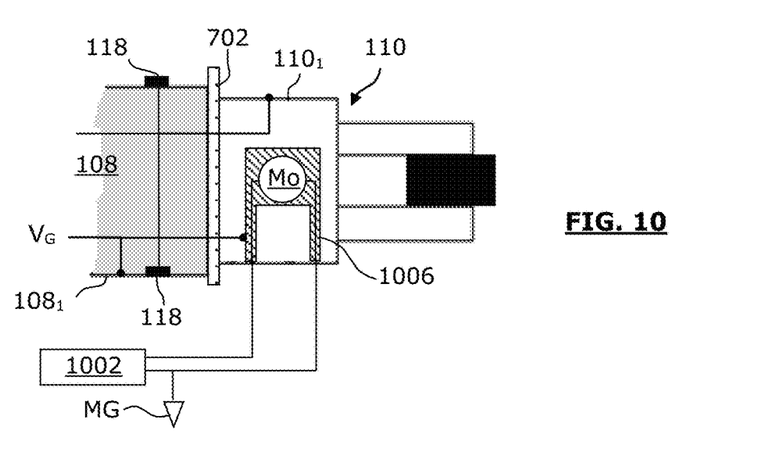

FIG. 10 is a diagrammatic representation of another example of a functional head that can be utilized in a robot according to the invention, in particular in any one of the robots in FIGS. 2-5.

In the example shown in FIG. 10, the functional head 110 comprises all the elements of the functional head in FIG. 8.

In addition, the functional head 110 comprises an electrical item, which in the present example is a motor Mo making it possible to move the grippers of the functional head 110.

The electric motor Mo receives a supply signal from, and optionally transmits an output signal making it possible to determine the position of the grippers to, a controller 1002 which can be a robot controller. Generally, these input/output signals are referenced to an electrical ground potential MG. Now, when the functional head 110 is used as capacitive detection electrode, then the motor Mo as well as the electrical lines conducting the input/output signals, referenced to the general ground potential MG, interfere with the detection carried out by the functional head 110.

In order to avoid this interference, the motor Mo, as well as the connectors and electronic unit associated therewith, are placed in a guard volume 1006 polarized at the guard potential $V_G$. Thus, the electric motor Mo and the connectors and electronic unit associated therewith, are not visible to the functional head 110 and do not interfere with the capacitive detection carried out by said functional head 110.

Of course, such a guard volume can also be used in combination with the embodiment in FIG. 9.

Figure 11:
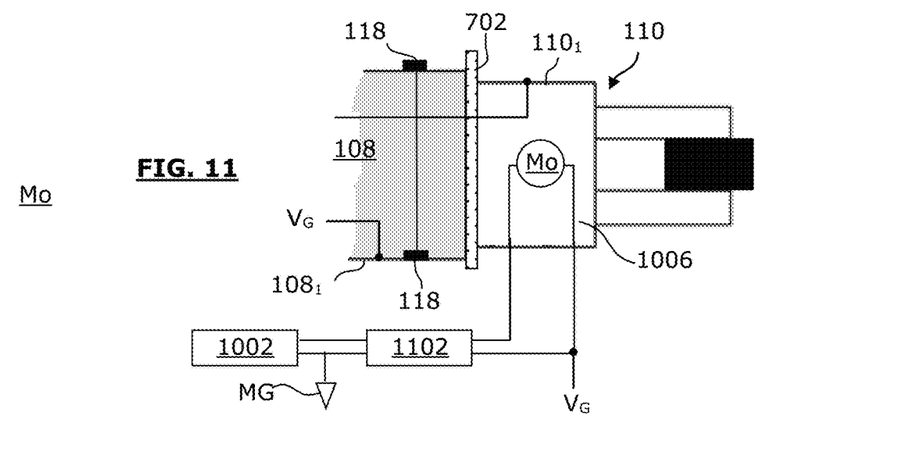

FIG. 11 is a diagrammatic representation of another example of a functional head that can be utilized in a robot according to the invention, in particular in any one of the robots in FIGS. 2-5.

In the example shown in FIG. 11, the functional head 110 comprises all the elements of the functional head in FIG. 10, with the exception of the guard volume 1006.

Instead of the guard volume, a potential converter 1102 is used. This converter 1102 is placed between the controller 1002 and the electric motor Mo. The function of this converter 1102 is to:

receive at least one electrical signal, called input signal, such as a supply or control signal, transmitted by the controller 1002 and intended for said electric motor Mo, and reference said input signal to the guard potential ($V_G$); and receive at least one electrical signal, called output signal, transmitted by said electric motor Mo and intended for the controller 1002, and reference said output signal to the electrical ground potential MG of the controller 1002.

Thus the electric motor Mo, as well as the connectors and the electronic unit associated therewith, are supplied by signals referenced to the guard potential $V_G$ and do not interfere with the detection electrode constituted by the functional head 110.

Of course, such a guard volume can also be used in combination with the embodiment in FIG. 9.

Figure 12:
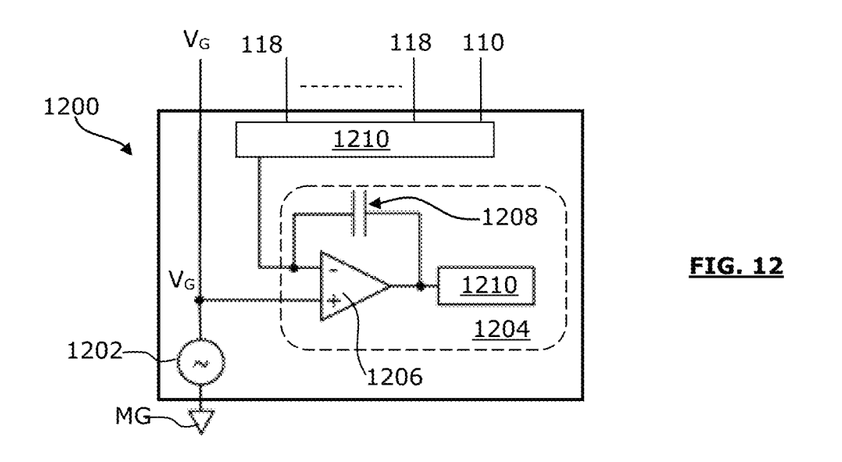
FIG. 12 is a diagrammatic representation of an embodiment of an electronic detection unit that can be utilized in a robot according to the invention.

FIG. 12 is a diagrammatic representation of an electronic detection unit that can be utilized in a robot according to the invention, in particular in any one of the robots in FIGS. 2-5.

The electronic module 1200, shown in FIG. 12, can be the electronic module 120 in FIGS. 2-5.

The electronic module 1200 comprises an oscillator 1202 that generates an alternating excitation voltage, denoted $V_G$, used as guard potential.

The electronic module 1200 also comprises an electronic detection unit 1204 composed of a current or charge amplifier, represented by an operational amplifier 1206 and a counter-reaction capacitor 1208.

The electronic detection unit 1204 also comprises a conditioner 1210 making it possible to obtain a signal representative of the sought coupling capacitance $C_{eo}$, and/or of the presence or the proximity of an object, a body. This conditioner 1210 can comprise for example a synchronous demodulator for demodulating the signal with respect to a carrier, at a working frequency. The conditioner 1210 can also comprise an asynchronous demodulator or an amplitude detector. This conditioner 1210 can of course be produced in an analogue and/or digital form (microprocessor), and comprise all necessary means for filtering, conversion, processing etc.

The electronic module 1200 can comprise an electronic detection unit 1204 dedicated to each of the detection electrodes 118 and to the functional head 110.

Alternatively, and as shown in FIG. 12, the electronic module 1200 can comprise a single electronic detection unit 1204 and a polling means 1210 connecting said electronic detection unit 1204 in turn with each measurement electrode 118 and with the functional head 110, so as to poll individually each of said measurement electrodes and the functional head 110.

Of course, the electronic module 1200 can comprise components other than those described.

In addition, the electronic module 1200 can be at least partially incorporated into an electronic unit of the robot, or into the body of the robot, or into the functional head, or also into an existing or additional interface, positioned between the functional head and the body of the robot.

The electronic module 1200 can also be presented in the form of a module or a housing external to the body of the robot. In this case, all or part of the electrical connections described can be located in the electronic module 1200, connected to the other elements with cables.

In the examples that have just been described, it is the casings/outer walls of a part or all of the sub-parts of the robot, namely the casings/outer walls of the segments 102-108 and/or of the functional head 110 and/or of the articulations 112-116, which are set at the guard potential $V_G$. This requires the casings/outer walls of these sub-parts to be at least partially electrically conductive.

However, it may be the case that a sub-part of the robot, such as for example an articulation, a segment or the functional head, comprises a casing/outer wall that is not electrically conductive.

When such a sub-part is equipped, i.e. it comprises at least one electrical item, then the latter may interfere with the capacitive detection if it is referenced to an electrical potential different from the first potential or from the guard potential.

In order to avoid such interference, the electrical item of a sub-part can be placed in a guard volume, as described in FIG. 10 for the functional head.

Alternatively or in addition, a potential converter can be used, as described in FIG. 11 for the functional head, in order to convert the electrical reference of the input/output signals to/from the item of the sub-part.

Figure 13:
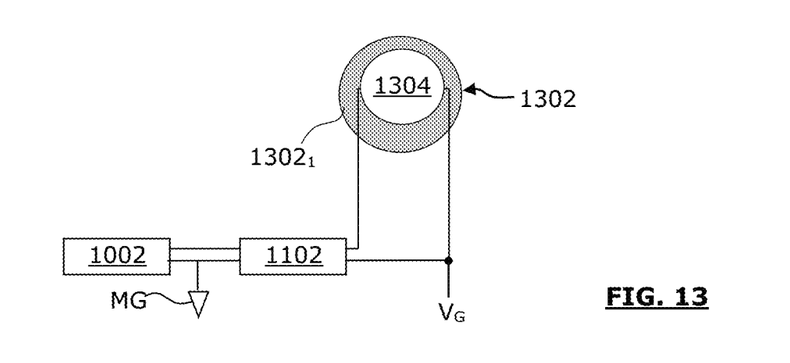
FIG. 13 is a diagrammatic representation of an articulation that can be utilized in a robot according to the invention.

FIG. 13 is a diagrammatic representation of an articulation that can be utilized in a robot according to the invention.

In particular, the articulation 1302 shown in FIG. 13 can be any one of the articulations 112-116 of the robot 100 and can be utilized in any one of the robots in FIGS. 1-11.

In the example shown, the casing/outer wall $1302_1$ of the articulation 1302 is not conductive, and cannot therefore be set at the guard potential $V_G$.

At the same time, the articulation 1302 comprises an electrical item, which in the present example is a motor 1304. In order to ensure that the motor 1304 placed in the articulation 1302 does not interfere with the capacitive detection in the robot, a potential converter, such as for example the converter 1102, is used. The function of this converter 1102 is to:

receive at least one electrical signal, called input signal, such as a supply or control signal, transmitted for example by the controller 1002 and intended for said motor 1304, and reference said input signal to the guard potential ($V_G$), and receive at least one electrical signal, called output signal, transmitted by said motor 1304 and intended for the controller 1002, and reference said output signal to the electrical ground potential MG of the controller 1002.

Thus the motor 1304, located in the articulation as well as the connectors and the electronic unit associated therewith, are supplied by signals referenced to the guard potential $V_G$ and do not interfere with the capacitive detection.

Alternatively, the converter can be replaced by a guard volume, such as described with reference to FIG. 10.

Figure 14:
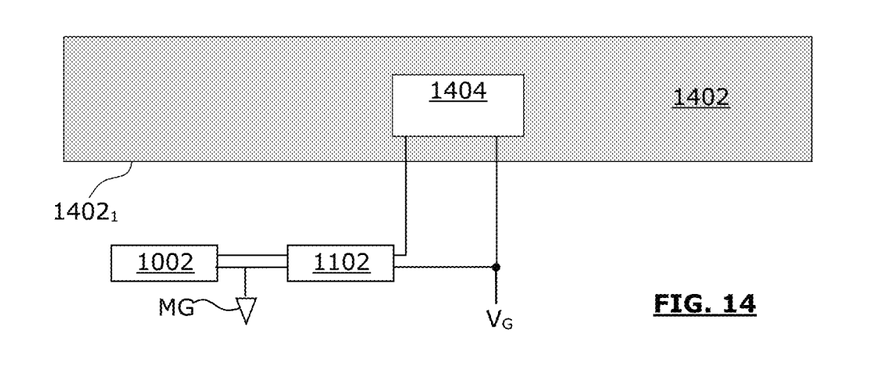
FIG. 14 is a diagrammatic representation of a segment that can be utilized in a robot according to the invention.

FIG. 14 is a diagrammatic representation of a segment that can be utilized in a robot according to the invention.

In particular, the segment 1402 shown in FIG. 14 can be any one of the segments 102-108 of the robot 100.

In the example shown, the outer casing $1402_1$ is not conductive, and cannot therefore be set at the guard potential $V_G$.

At the same time, the segment 1402 comprises an electrical item, which in the present example is an electrical module 1404. In order to ensure that the electrical module 1404 does not interfere with the capacitive detection in the robot, a potential converter, such as for example the converter 1102, is used. The function of this converter is to:

receive at least one electrical signal, called input signal, such as a supply or control signal, transmitted for example by the controller 1002 and intended for the module 1404, and reference said input signal to the guard potential ($V_G$); and receive at least one electrical signal, called output signal, transmitted by the module 1404 and intended for the controller 1002, and reference said output signal to the electrical ground potential MG of the controller 1002.

Thus the module, located in the articulation as well as the connectors and the electronic unit associated therewith, are supplied by signals referenced to the guard potential $V_G$ and do not interfere with the capacitive detection.

Alternatively, the converter can be replaced by a guard volume, such as described with reference to FIG. 10.

The converter used can be common to all the items with which the robot is equipped. Alternatively, a converter can be dedicated to an item, or a group of items.

Of course, an electrical item of a sub-part, such as a segment or an articulation, can be placed in a guard volume, or referenced to a guard potential by a potential converter as described in relation to FIG. 13 or FIG. 14, even if the casing or the outer wall of the sub-part is partially or totally electrically conductive, and in particular even if it is polarized at the guard potential $V_G$.

In this case, all of the sub-part can be referenced to the guard potential $V_G$.

A sub-part such as an articulation or a segment can of course comprise measurement electrodes 118 placed on a part of the non-conductive casing/outer wall.

According to whether or not it comprises conductive internal elements or electrical items polarized at or referenced to the guard potential $V_G$, it may be preferable to insert a guard plane vis-à-vis the face of the electrodes directed towards the inside of the sub-part, in order to ensure that the measurement electrodes are only sensitive to the presence of objects close to their outer face. This guard plane can be placed for example between the measurement electrodes and the outer wall, or on the inner face of the wall of the sub-part.

Of course, the invention is not limited to the examples which have just been described and numerous adjustments can be made to these examples without exceeding the scope of the invention.

The invention claimed is:

1. A robot comprising:
   at least one sub-part, called equipped sub-part, at least one capacitive detection electrode, called measurement electrode, placed on, or in, an outer wall of said equipped sub-part;
   at least one means of electrical polarization for polarizing said at least one measurement electrode at a first alternating electrical potential, which is different from a general ground potential (MG), at a frequency, called working frequency; and
   at least one electronic unit, called detection unit, for measuring a signal relative to a coupling capacitance, called electrode-object capacitance, between the at least one measurement electrode and a nearby object,
   wherein said at least one polarization means is also arranged to polarize at least one electrically conductive part of the outer wall of said equipped sub-part, at an alternating electrical potential ($V_G$), called guard potential, which is identical or substantially identical to said first alternating electrical potential, at said working frequency.

2. The robot according to claim 1, wherein said equipped sub-part of said robot is:
   a segment of said robot, or
   a mechanical interface, which is articulated or non-articulated, between at least two segments of said robot, or
   a functional head, which is articulated or non-articulated, forming a tool, or a tool head.

3. The robot according to claim 1, further comprising another sub-part, called non-equipped sub-part, not comprising a measurement electrode, at least one electrically conductive part of the outer wall is polarized at the guard potential ($V_G$).

4. The robot according to claim 1, wherein the outer wall is not polarized at the guard potential ($V_G$).

5. The robot according to claim 1, further comprising another sub-part called fitted-out sub-part, comprising at least one electrical item (Mo) placed in said fitted out sub-part.

6. The robot according to claim 5, wherein the fitted-out sub-part comprises, for at least one item, a volume or walls, called guard volume or guard walls, placed around said at least one item and polarized at the guard potential ($V_G$).

7. The robot according to claim 5, wherein the fitted-out sub-part comprises at least one item electrically polarized at, or referenced to, the guard potential ($V_G$).

8. The robot according to claim 1, further comprising a functional head formed forming a capacitive detection electrode, the at least one electrical polarization means also being arranged to polarize said functional head at the first alternating electrical potential, and the at least one electronic detection unit being arranged to measure a signal relating to a coupling capacitance between said functional head and a nearby object.

9. The robot according to claim 8, further comprising at least one electrical item (Mo) arranged in the functional head, and for at least one item, a volume or walls, called guard volume or guard walls, placed around said at least one item and polarized at the guard potential ($V_G$).

10. The robot according to claim 7, further comprising, for at least one electrical item (Mo) that is electrically polarized at, or referenced to, the guard potential ($V_G$), at least one electrical converter arranged to:
    receive at least one electrical signal, called input signal, such as a supply input signal or a control input signal, intended for said at least one electrical element (Mo), and reference said input signal to the guard potential ($V_G$); and/or
    receive at least one electrical signal, called output signal, transmitted by said at least one electrical item (Mo), and reference said output signal to the electrical ground potential (MG) of a controller for which it is intended.

11. The robot according to claim 10, wherein the electrical converter comprises:
    at least one supply with galvanic isolation, such as a DC/DC converter, for generating the input signal for said at least one electrical item (Mo);
    at least one electrical interface without galvanic contact, of the capacitive type or by opto-coupler, for the input signal, or the output signal;
    one or more high-impedance inductors for receiving and transmitting the input signal or the output signal; and/or
    at least one capacitor-commutated charge-transfer or charge-pump converter.

12. The robot according to claim 1, wherein the outer wall of each sub-part of said robot is polarized at the guard potential, and further comprises an interface for fastening said robot to an external support, and an electrical insulator at said fastening interface.

13. The robot according to claim 1, wherein for said equipped sub-part, the outer wall is produced, at least partially:
    from an electrically conductive material, or
    from an electrically non-conductive material comprising an electrically conductive layer.

14. The robot according to claim 1, wherein the robot is presented in one of the following forms: robotized arm, mobile robot or android.

* * * * *